(12) United States Patent
Orihashi et al.

(10) Patent No.: US 10,393,004 B2
(45) Date of Patent: Aug. 27, 2019

(54) WATER PUMP FITTING STRUCTURE OF VEHICLE ENGINE

(71) Applicant: Kawasaki Jukogyo Kabushiki Kaisha, Kobe-shi, Hyogo (JP)

(72) Inventors: Yoshihiko Orihashi, Kobe (JP); Jun Takagi, Himeji (JP); Masato Kinoshita, Kakogawa (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 0 days.

(21) Appl. No.: 15/861,237

(22) Filed: Jan. 3, 2018

(65) Prior Publication Data

US 2019/0203631 A1 Jul. 4, 2019

(51) Int. Cl.
*F01P 5/12* (2006.01)
*F16F 15/26* (2006.01)
*F02B 67/04* (2006.01)

(52) U.S. Cl.
CPC ............. *F01P 5/12* (2013.01); *F02B 67/04* (2013.01); *F16F 15/264* (2013.01)

(58) Field of Classification Search
CPC ......... F02B 67/06; F02B 61/06; F01M 11/00; F01M 2001/0276; F01P 5/12; F01P 5/10
See application file for complete search history.

(56) References Cited

U.S. PATENT DOCUMENTS

| | | | | |
|---|---|---|---|---|
| 2001/0025742 | A1* | 10/2001 | Ohyama | F01M 1/02 184/6.5 |
| 2002/0104701 | A1* | 8/2002 | Fukuda | B60K 11/08 180/224 |
| 2007/0095306 | A1* | 5/2007 | Fujimoto | F01P 5/04 123/41.63 |
| 2007/0101952 | A1* | 5/2007 | Fujimoto | F01P 5/12 123/41.44 |
| 2008/0161142 | A1* | 7/2008 | Shiozaki | F02B 61/02 474/70 |
| 2016/0084147 | A1* | 3/2016 | Sotani | F01M 1/02 123/196 A |
| 2016/0091077 | A1* | 3/2016 | Sotani | F16H 57/021 74/606 R |

* cited by examiner

*Primary Examiner* — Long T Tran (57) ABSTRACT

A water pump is mounted to a combustion engine having a crank shaft extending in a vehicle widthwise direction, a crankcase supporting the crank shaft and a covering member fastened to an abutting surface at one side surface of the crankcase. The water pump includes: a water pump shaft that is disposed in parallel to the crankshaft and is drivingly coupled with the crankshaft; an impeller fixed to a distal end portion of the water pump shaft; and a pump casing rotatably supporting the water pump shaft. The water pump is disposed laterally inward of the abutting surface in the vehicle widthwise direction. The water pump shaft is inserted through an insertion hole provided in the crankcase. The pump casing is fitted in a mounting hole provided at an outer surface of the crankcase.

8 Claims, 7 Drawing Sheets

WATER PUMP FITTING STRUCTURE OF VEHICLE ENGINE

BACKGROUND OF THE INVENTION

Field of the Invention

The present invention relates to a water pump fitting structure in which a water pump is driven in conjunction with a vehicle combustion engine and supplies cooling water to a high-temperature part of the combustion engine.

Description of Related Art

A vehicle combustion engine has been known which has a crankshaft extending in a vehicle widthwise direction and a water pump that is driven in conjunction with the crankshaft. A pump shaft of the water pump is disposed in parallel to the crankshaft, and rotates in conjunction with the crankshaft. Thus, an impeller provided at the distal end of the pump shaft is rotated, and cooling water is supplied to a high-temperature part of the combustion engine.

In such a combustion engine, a housing, which covers the impeller of the water pump from the outer lateral side, is often provided on an outer side surface of a crankcase of the combustion engine. Therefore, the size of the combustion engine is apt to increase in the vehicle widthwise direction.

DISCLOSURE OF THE INVENTION

An object of the present invention is to provide a water pump fitting structure that is able to suppress an increase in the size of a vehicle combustion engine in the vehicle widthwise direction.

In order to attain the aforementioned object, a vehicle with a water pump fitting structure according to the present invention includes an engine having a crankshaft extending in a vehicle widthwise direction, a crankcase supporting the crank shaft and a covering member fastened to an abutting surface at one side surface of the crankcase. The water pump includes: a water pump shaft disposed in parallel to the crankshaft, the water pump shaft being drivingly coupled with the crankshaft; an impeller fixed to a distal end portion of the water pump shaft; and a pump casing rotatably supporting the water pump shaft. The water pump is disposed laterally inward of the abutting surface in the vehicle widthwise direction, and the pump casing is fitted in a mounting hole provided at an outer surface of the crankcase. The covering member is, for example, a clutch cover that covers an outer lateral side of a clutch.

According to this configuration, the water pump is disposed laterally inward, in the vehicle widthwise direction, of the abutting surface at which the crankcase abuts the covering member. That is, the water pump does not project from the combustion engine in the vehicle widthwise direction, with respect to the covering member. Thus, the combustion engine can be prevented from increasing in size in the vehicle widthwise direction. As a result, mounting of the combustion engine on the vehicle is facilitated, and also, the degree of freedom in component arrangement is increased.

In the present invention, a portion of the water pump may be accommodated in a recess that is formed at a position laterally inward of the abutting surface of the crankcase in the vehicle widthwise direction and that is recessed in a direction perpendicular to the water pump shaft. According to this configuration, a portion of the water pump is accommodated in the recess formed at a position laterally inward of the abutting surface of the crankcase in the vehicle widthwise direction. Thus, the water pump is inhibited from projecting from the crankcase in the direction perpendicular to the crankshaft.

In the present invention, the mounting hole may overlap a portion of the abutting surface in a side view. According to this configuration, since the mounting hole overlaps a portion of the abutting surface in a side view, a portion of the pump casing fitted in the mounting hole also overlaps the portion of the abutting surface. Thus, the water pump can be disposed close to the crankshaft in the radial direction, thereby inhibiting the water pump from projecting from the crankcase in the radial direction perpendicular to the crankshaft. As a result, the combustion engine can be reduced in size in the direction perpendicular to the crankshaft.

In the present invention, an axis of the water pump shaft may be displaced upward with respect to a center of the mounting hole. According to this configuration, the pump casing can be easily disposed at an upper position. As a result, the combustion engine can be reduced in size in an up-down direction or vertical direction.

In the present invention, the engine may include a pump driving shaft connected to the crankshaft, and the water pump shaft may be concentrically connected to one end portion of the pump driving shaft. According to this configuration, the assembly of the water pump including the water pump shaft can be mounted to the pump driving shaft. Thus, mounting of the water pump is facilitated. In this case, the engine may include an oil pump provided at the other end portion of the pump driving shaft. According to this configuration, since the single pump driving shaft can be shared by the two pumps, the structure is simplified.

In the present invention, the water pump may be located above a drive shaft that extends through a lateral side of an oil pan of the combustion engine. According to this configuration, the combustion engine can be reduced in size, and the drive shaft can be disposed in a space secured by the size reduction of the combustion engine.

In the present invention, when the engine includes a balancer shaft gear-connected to the crankshaft and a balancer weight provided at an end portion of the balancer shaft, the water pump may be disposed laterally inward, in the vehicle widthwise direction, of the balancer weight. According to this configuration, the water pump can be easily accommodated in the crankcase. As a result, the combustion engine can be reduced in size in the vehicle widthwise direction.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
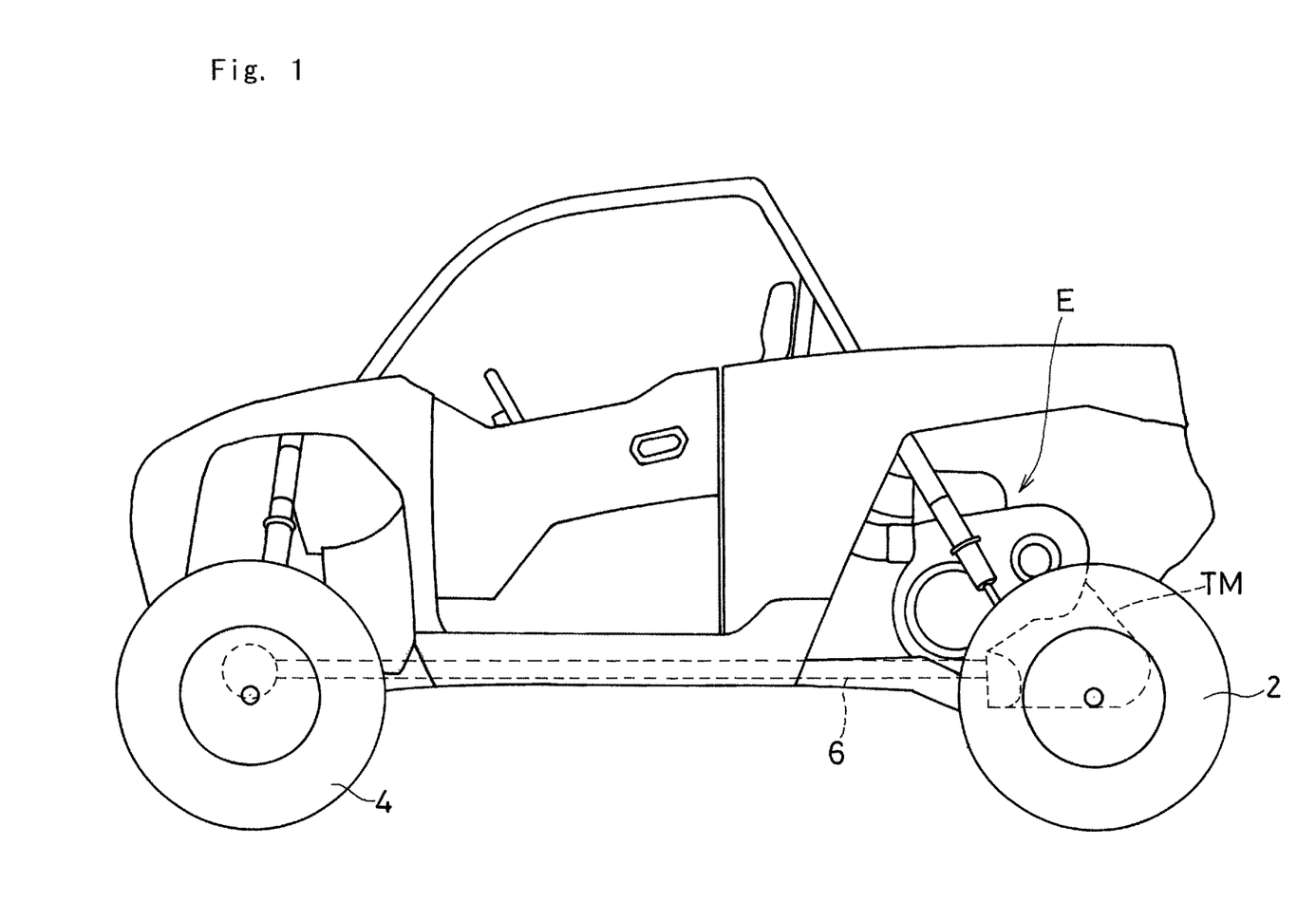
FIG. 1 is a side view of a vehicle equipped with a vehicle combustion engine having a water pump fitting structure according to a first embodiment of the present invention.

Hereinafter, an embodiment of the present invention will be described with reference to the drawings. In this embodiment, the terms "left side" and "right side" are the left side and the right side relative to a driver maneuvering a vehicle to travel forwards. FIG. 1 is a side view of a vehicle equipped with a vehicle combustion engine having a water pump fitting structure according to a first embodiment of the present invention. The vehicle of the present embodiment is an all-terrain vehicle called "four-wheeled buggy", which can travel on any terrain such as bog, sandy beaches, snowy roads, etc.

A combustion engine E as a driving source is mounted on a rear portion of the vehicle. The combustion engine E is disposed between right and left rear wheels 2. The vehicle of the present embodiment is a four-wheel drive vehicle. Specifically, rotary motion generated by the combustion engine E is transmitted to the rear wheels 2 via a continuously variable transmission 26 and a gear box 34, both described later, and is transmitted to front wheels 4 via a drive shaft 6. In a two-wheel (rear-wheel) drive vehicle, the drive shaft 6 is omitted. The vehicle of the present embodiment is a four-wheel drive vehicle that is switchable between four-wheel driving and two-wheel driving by an actuator (not shown) provided in the gear box 34.

Figure 2:
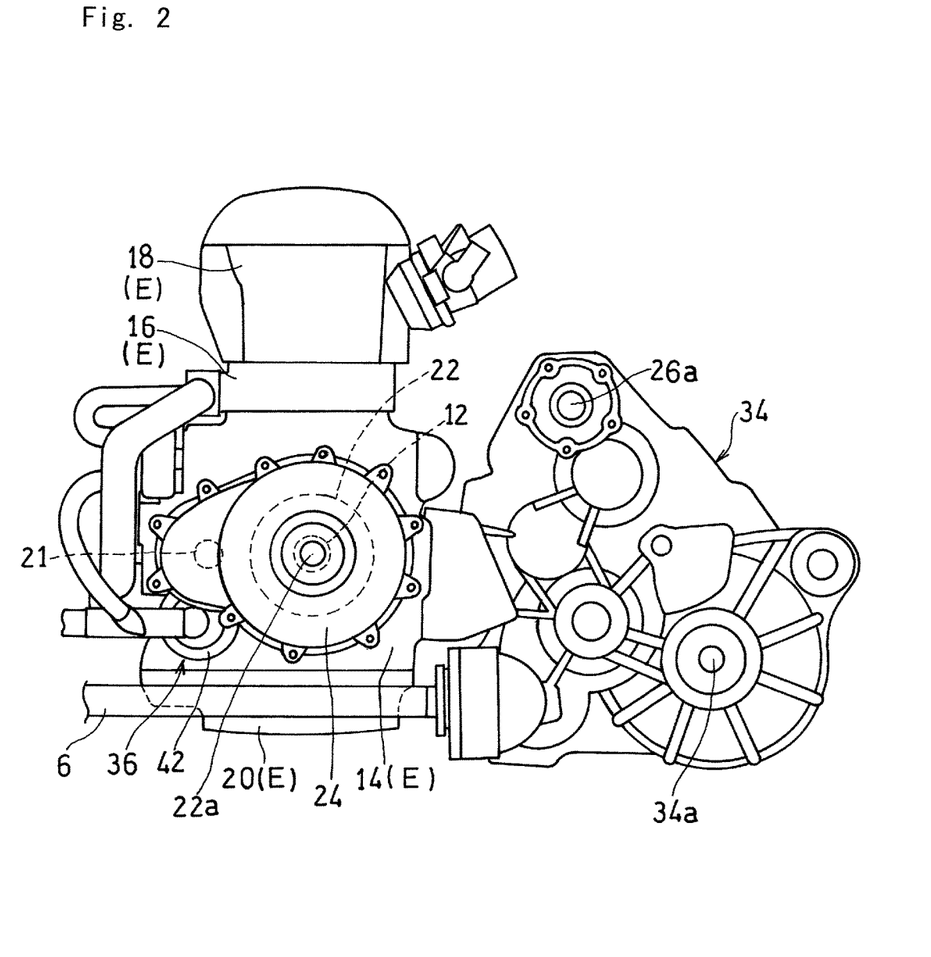
FIG. 2 is a side view of the combustion engine.
Figure 3:
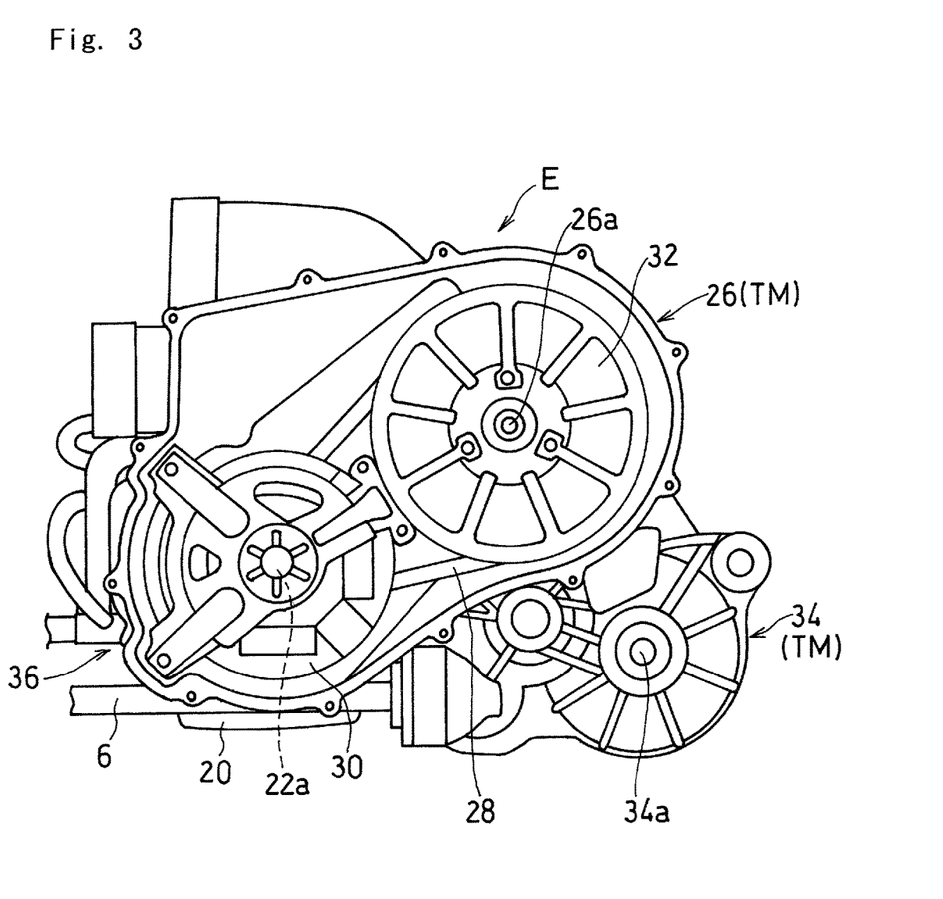
FIG. 3 is a side view of the combustion engine and a continuously variable transmission.
Figure 4:
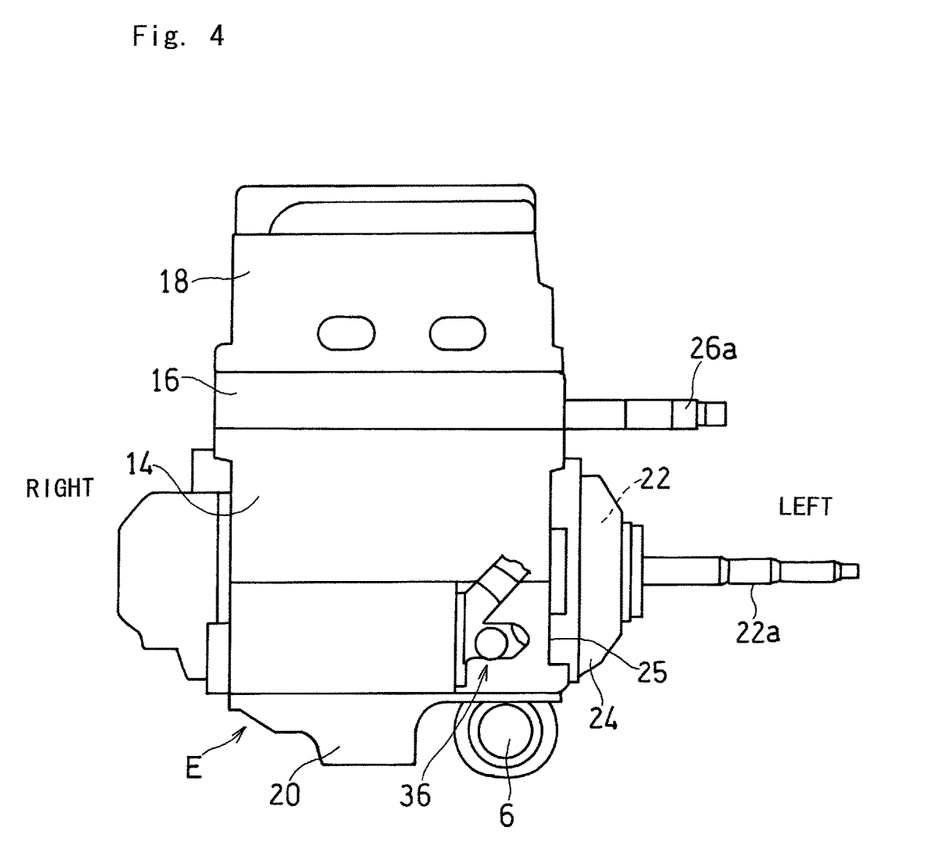
FIG. 4 is a front view of the combustion engine as viewed from the front of the vehicle.

FIG. 2 is a side view of the combustion engine E. FIG. 3 is a side view of the combustion engine E and the continuously variable transmission 26. FIG. 4 is a front view of the combustion engine E as viewed from the front of the vehicle. As shown in FIG. 2, the combustion engine E includes: a crankshaft 12 extending in a vehicle widthwise direction; a crankcase 14 supporting the crankshaft 12; a cylinder 16 projecting upward from the crankcase 14; a cylinder head 18 disposed on an upper portion of the cylinder 16; and an oil pan 20 mounted to a lower portion of the crankcase 14.

A balancer shaft 21 gear-connected to the crankshaft 12 is disposed frontward of the crankshaft 12 in a side view. The balancer shaft 21 is rotatably supported by the crankcase 14. A balancer weight 60 (FIG. 6) described later is mounted to the balancer shaft 21, so as to reduce vibration generated from the crankshaft 12.

A clutch 22 is connected to a left end portion of the crankshaft 12. The clutch 22 is operable to selectively transmit rotation of the crankshaft 12 to the continuously variable transmission 26 or cuts off the transmission. A clutch cover 24 is mounted on a left side surface of the crankcase 14. Specifically, as shown in FIG. 4, the clutch cover 24 abuts an abutting surface 25 at the left side surface of the crankcase 14 and is fastened to the abutting surface 25. That is, the clutch cover 24 forms a cover body or a covering member that is fastened to the abutting surface 25 at one side surface of the crankcase 14. The clutch cover 24 covers the clutch 22 from the outer lateral side.

An output shaft 22a of the clutch 22 projects laterally outward (leftward) from the clutch cover 24. This output shaft 22a is connected to the continuously variable transmission 26 shown in FIG. 3. That is, the output shaft 22a forms a driving-side shaft of the continuously variable transmission 26. The continuously variable transmission 26 is a power transmission mechanism that continuously changes a transmission gear ratio by using a mechanism other than gears. The continuously variable transmission 26 of the present embodiment includes a belt 28 and two variable diameter pulleys 30 and 32, and steplessly changes the transmission gear ratio by a combination of the belt 28 and the pulleys 30 and 32. The continuously variable transmission 26 is detachably fastened to the crankcase 14 via a metal fitting. In FIG. 3, a CVT cover that covers the belt 28 and the variable diameter pulleys 30 and 32 from the outer lateral side is not shown.

The driving-side pulley 30 is mounted to the output shaft 22a of the clutch 22 so as to be non-rotatable relative to the output shaft 22a. The driven-side pulley 32 is mounted to an output shaft 26a of the continuously variable transmission 26 so as to be non-rotatable relative to the output shaft 26a. These pulleys 30 and 32 are connected to each other via the belt 28. The gear box 34 shown in FIG. 2 is connected to the output shaft 26a of the continuously variable transmission 26. That is, the output shaft 26a of the continuously variable transmission 26 forms an input shaft of the gear box 34.

The gear box 34 distributes the power received from the continuously variable transmission 26 to axles of the front and rear wheels 4 and 2. Specifically, an output shaft 34a of the gear box 34 is connected to the axle of the rear wheels 2 (FIG. 1), and the drive shaft 6, connected to the gear box 34, transmits the power to the axle of the front wheels 4. The gear box 34 may be provided with an auxiliary transmission having one or a plurality of low range gears. The actuator (not shown) for switching between four-wheel driving and two-wheel driving is provided in a front lower portion of the gear box 34. The actuator may be provided on the front wheel side, in place of the gear box 34. The drive shaft 6 is connected to the actuator. The drive shaft 6 is disposed below the crankcase 14 and extends in a front-rear direction or longitudinal direction of the vehicle through the left side of the oil pan 20.

Figure 5:
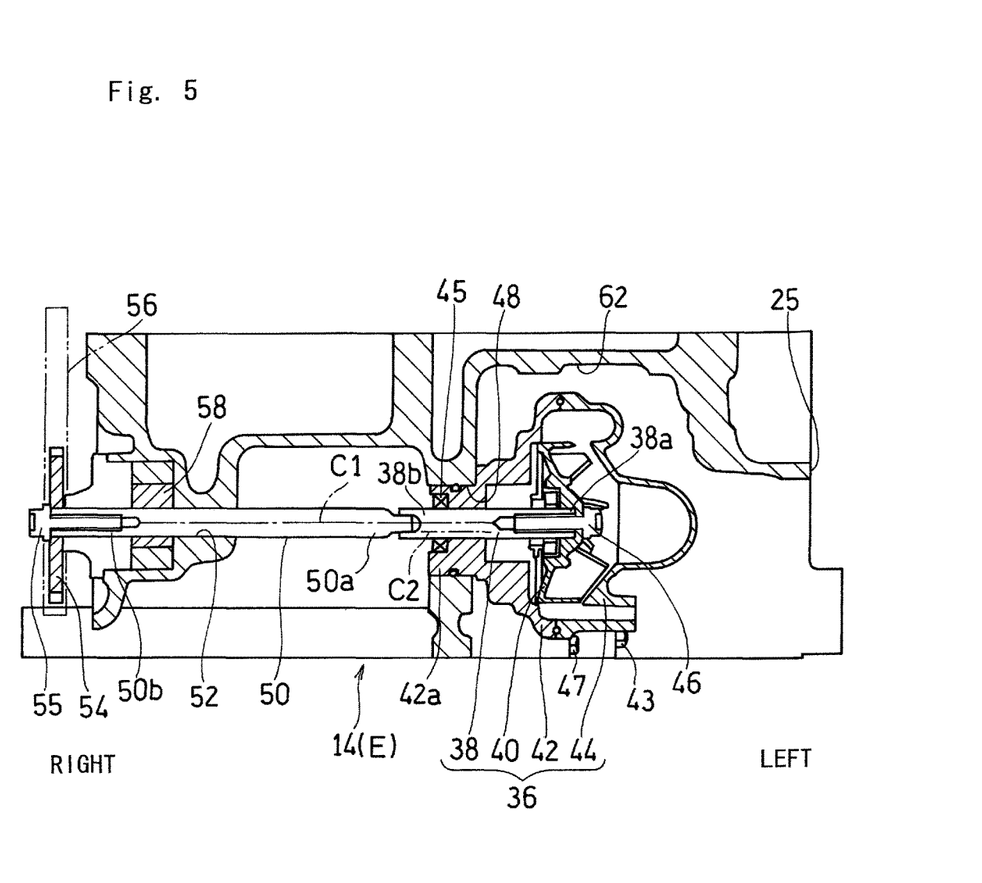
FIG. 5 is a vertical cross-sectional view of the water pump.

A water pump 36 is provided on the left side surface of the crankcase 14. The water pump 36 is driven in conjunction with the crankshaft 12, and supplies cooling water to a high-temperature part of the combustion engine E. As shown in FIG. 5, the water pump 36 includes: a water pump shaft 38 extending in parallel to the crankshaft 12 in the vehicle widthwise direction; an impeller 40 fixed to a distal end portion (left end portion) 38a of the water pump shaft 38; a pump casing 42 that rotatably supports the water pump shaft 38; and an impeller housing 44 that covers the impeller 40 from the outer lateral side.

The water pump shaft 38 is rotatably supported by the pump casing 42 via a bearing 45. The impeller 40 is fixed to the distal end portion 38a of the water pump shaft 38 by means of a bolt 46. The pump casing 42 and the impeller housing 44 are connected to each other by means of a plurality of fastening members 43. The water pump shaft 38, the impeller 40, the pump casing 42, and the impeller housing 44 together form an assembly of the water pump 36. A mounting hole 48 directed laterally outward is provided at an outer side surface on one side (left side) of the crankcase 14. A base end portion (right end portion) 42a of the pump casing 42 is fitted in the mounting hole 48, and is fastened by means of a plurality of bolts 47, whereby the assembly of the water pump 36 is mounted to the combustion engine E.

A proximal end portion (right end portion) 38b of the water pump shaft 38 is connected to one end portion (left end portion) 50a of a pump driving shaft 50 connected to the crankshaft 12 so as to be axially disconnectable. In the present embodiment, the water pump shaft 38 is concentrically connected to the pump driving shaft 50. An insertion hole 52 directed in the vehicle widthwise direction (right-left direction) is formed in the crankcase 14. The pump driving shaft 50 is inserted through the insertion hole 52 so as to be rotatably supported by the crankcase 14.

A sprocket 54 is fixed to the other end portion (right end portion) 50b of the pump driving shaft 50. The sprocket 54 is mounted to the other end portion (right end portion) 50b of the pump driving shaft 50 by means of a bolt 55. A chain 56 is put around the sprocket 54. Rotation of the crankshaft 12 (FIG. 2) is transmitted to the pump driving shaft 50 through the chain 56. However, the structure for transmitting the power from the crankshaft 12 to the pump driving shaft 50 is not limited thereto.

An oil pump 58 is provided at the other end portion 50b of the pump driving shaft 50. The oil pump 58 is driven in conjunction with the crankshaft 12, and supplies oil to a to-be-lubricated part of the combustion engine E. In the present embodiment, the oil pump 58 is provided, on the pump driving shaft 50, inward of (at the left side of) the sprocket 54 and outward of (at the right side of) the insertion hole 52.

Figure 7:
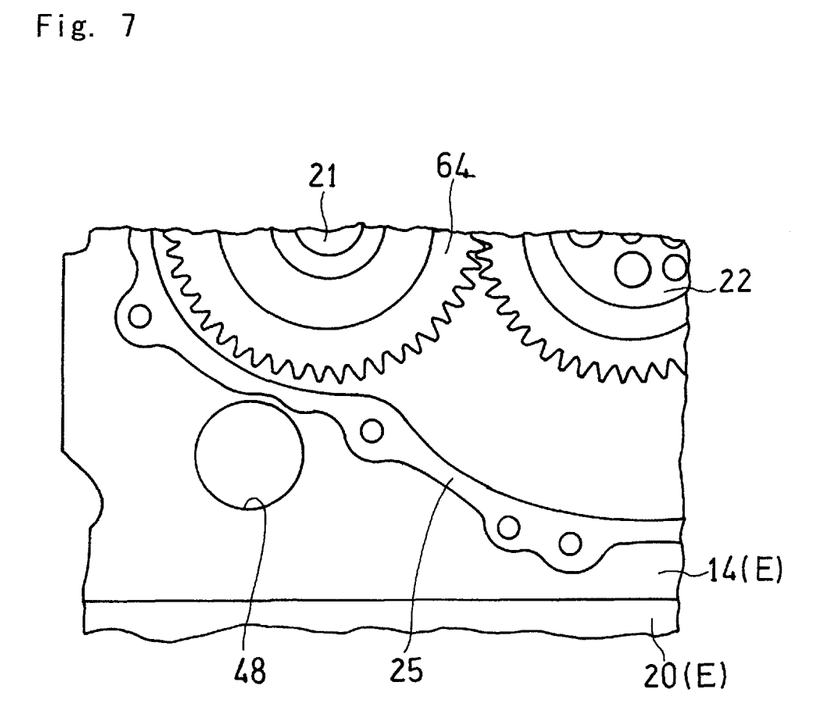
FIG. 7 is a side view showing, in an enlarged manner, a mounting hole of the water pump and its surroundings.

As shown in FIG. 4, the water pump 36 is disposed laterally inward of the abutting surface 25 in the vehicle widthwise direction. The water pump 36 is disposed above the drive shaft 6. As shown in FIG. 2, the water pump 36 is disposed in front of the clutch 22 and below the balancer shaft 21 in a side view. In addition, a portion of the water pump 36 overlaps a portion of the clutch cover 24 in a side view. Specifically, as shown in FIG. 7, in a side view, the mounting hole 48 for the water pump 36 is close to a portion of the abutting surface 25, and overlaps a portion of an outer periphery of the clutch cover 24 that abuts the crankcase 14 at the abutting surface 25.

As shown in FIG. 5, a recess 62, which is recessed in a direction perpendicular to the water pump shaft 38, is formed laterally inward of the abutting surface 25 of the crankcase 14 in the vehicle widthwise direction. In the present embodiment, the recess 62 is recessed upward. A portion of the water pump 36 is accommodated in the recess 62. An axis C1 of the water pump shaft 38 is displaced upward with respect to a center C2 of the mounting hole 48. In other words, the insertion hole 52 of the pump driving shaft 50 is displaced upward with respect to the mounting hole 48.

Figure 6:
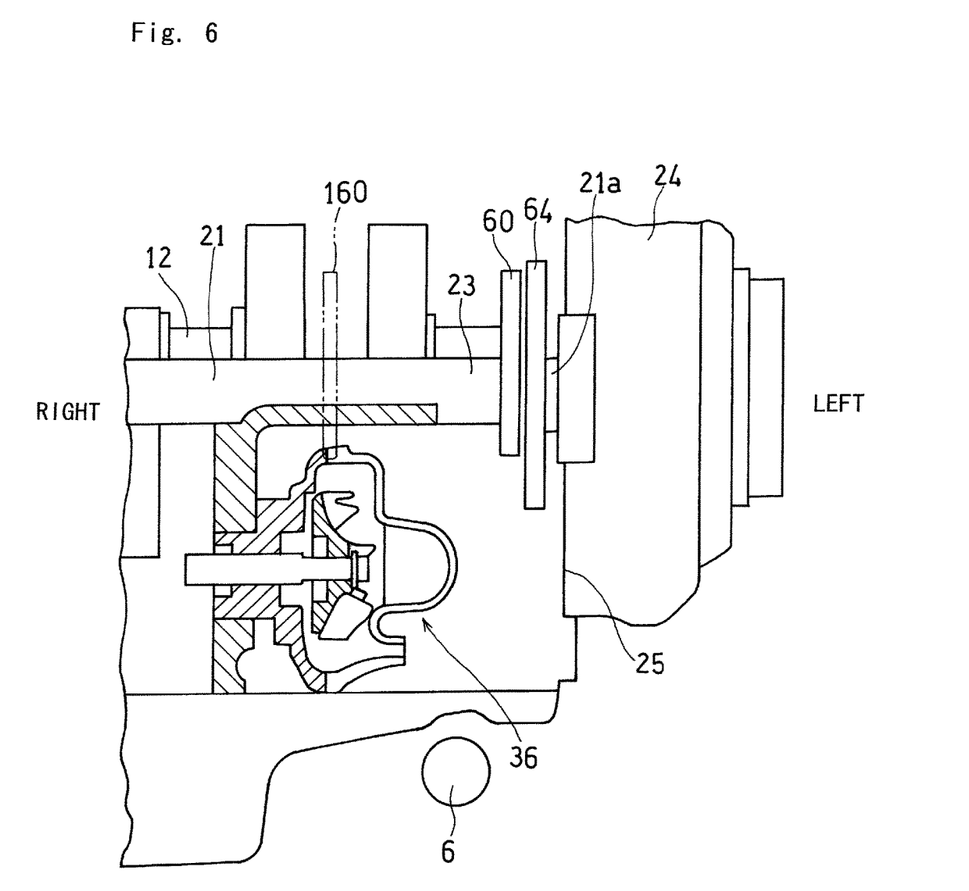
FIG. 6 is a cross-sectional view of the water pump, at a cross section different from FIG. 5.

FIG. 6 shows a cross section different from the cross section shown in FIG. 5. As described above, the balancer shaft 21 is disposed in front of the crankshaft 12, and is supported by the crankcase 14 at a journal portion 23 of the one end portion (left end portion) 21a thereof. A balancer gear 64 is provided on the balancer shaft 21 outward of (at the left side of) the journal portion 23. The balancer gear 64 meshes with a gear (not shown) provided on the crankshaft 12. In the present embodiment, the balancer weight 60 of the balancer shaft 21 is provided at the one end portion 21a of the balancer shaft 21. Specifically, the balancer weight 60 is provided, on the one end portion 21a of the balancer shaft 21, inward of (at the right side of) the balancer gear 64 and outward of (at the left side of) the journal portion 23. The water pump 36 is disposed below the balancer shaft 21 and laterally inward of the balancer weight 60 in the vehicle widthwise direction.

In the configuration of the above embodiment, as shown in FIG. 4, the water pump 36 is disposed laterally inward, in the vehicle widthwise direction, of the abutting surface 25 at which the crankcase 14 abuts the clutch cover 24. That is, the water pump 36 does not project from the crankcase 14 in the vehicle widthwise direction, with respect to the clutch cover 24. Thus, the combustion engine E can be prevented from increasing in size in the vehicle widthwise direction. As a result, mounting of the combustion engine E on the vehicle is facilitated, and also, the degree of freedom in component arrangement is increased. In the present embodiment, since the water pump 36 does not project in the vehicle widthwise direction, the continuously variable transmission 26, shown in FIG. 3, can be easily installed.

As shown in FIG. 5, the recess 62 recessed upward is formed laterally inward of the abutting surface 25 of the crankcase 14 in the vehicle widthwise direction, and a portion of the water pump 36 is accommodated in the recess 62. Thus, since the water pump 36 is disposed upward, the size, in the up-down direction or vertical direction, of the combustion engine E can be reduced. As a result, it is easy to dispose the drive shaft 6 (FIG. 4) below the combustion engine E. Further, a portion of the water pump 36 is disposed inward of the abutting surface 25 inside the crankcase 14, in the vehicle widthwise direction, and therefore, it is easy to dispose the water pump 36 laterally inward of the abutting surface 25 in the vehicle widthwise direction.

As shown in FIG. 2, the mounting hole 48 (FIG. 5) and a portion of the pump casing 42 fitted in the mounting hole 48 overlap a portion of the abutting surface 25 in a side view. Thus, the water pump 36 can be disposed close to the crankshaft 12, that is, at an upper position. As a result, the water pump 36 can be inhibited from projecting from the crankcase 14 in the direction perpendicular to the crankshaft 12. Therefore, the size, in the vertical direction, of the combustion engine E can be reduced.

As shown in FIG. 5, the axis C1 of the water pump shaft 38 is displaced upward with respect to the center C2 of the mounting hole 48. Thus, it is easy to dispose the pump casing 42 at an upper position. As a result, the combustion engine E can be reduced in size in the vertical direction. Even when the mounting hole 48 may be disposed at an upper position, the pump casing 42 may be disposed at an upper position. However, as shown in FIG. 7, since the mounting hole 48 is close to a portion of the abutting surface 25 in a side view, it is necessary to form the mounting hole 48 so as not to interfere with the abutting surface 25 when forming the mounting hole 48 in the crankcase 14. Therefore, there are constraints on disposing the mounting hole 48 at an upper position. In the present embodiment, under such constraints, the pump casing 42 is disposed at an upper position by adopting the configuration in which the axis C1 of the water pump shaft 38 is located above the center C2 of the mounting hole 48.

As shown in FIG. 5, the water pump shaft 38 is concentrically connected to the one end portion 50a of the pump driving shaft 50 so as to be disconnectable from the pump driving shaft 50. Thus, the assembly of the water pump 36 including the water pump shaft 38 can be mounted to the pump driving shaft 50. As a result, mounting of the water pump 36 is facilitated. Further, the oil pump 58 is provided at the other end portion 50b of the pump driving shaft 50. Thus, the single pump driving shaft 50 can be shared by the two pumps 36 and 58, thereby simplifying the structure.

As shown in FIG. 6, the balancer weight 60 is provided at the one end portion 21a of the balancer shaft 21, and the water pump 36 is disposed laterally inward of the balancer weight 60 in the vehicle widthwise direction. As shown by a double dotted line in FIG. 6, if a balancer weight 160 is provided at a center portion, in the axial direction (vehicle widthwise direction), of the balancer shaft 21, the water pump 36 needs to be disposed outward of (at the left side of) the balancer weight 160 or below the balancer weight 160 to avoid interference with the balancer weight 160, which causes an increase in size of the combustion engine E in the vehicle widthwise direction or in the vertical direction. In the above configuration, however, since the balancer weight 60 is disposed at the one end portion 21a of the balancer shaft 21, the water pump 36 can be easily accommodated in the crankcase 14. Specifically, the water pump 36 can be disposed inward in the vehicle widthwise direction, and at an upper position. As a result, the combustion engine E can be reduced in size in the vehicle widthwise direction as well as in the vertical direction.

As described above, in the water pump fitting structure according to the above embodiment, the water pump 36 is disposed as far inward in the vehicle widthwise direction as possible and as far upward as possible. Thus, the combustion engine E is reduced in size in the vehicle widthwise direction as well as in the vertical direction. As a result, mounting of the combustion engine E on the vehicle is facilitated, and the degree of freedom in component arrangement is increased. In the above embodiment, the continuously variable transmission 26 (FIG. 2) can be easily disposed outward in the vehicle widthwise direction, and the drive shaft 6 can be disposed in a space secured below the combustion engine E.

The present invention is not limited to the embodiment described above, and various additions, modifications, or deletions may be made without departing from the gist of the invention. For example, in the above embodiment, the water pump fitting structure of the present invention is applied to a combustion engine of a four-wheeled buggy (all-terrain vehicle). However, the water pump fitting structure of the present invention is applicable to general vehicle combustion engines. Therefore, these are construed as included within the scope of the present invention.

REFERENCE NUMERALS

6 . . . drive shaft
12 . . . crankshaft
14 . . . crankcase
20 . . . oil pan
21 . . . balancer shaft
24 . . . clutch cover (covering member)
25 . . . abutting surface
36 . . . water pump
38 . . . water pump shaft
40 . . . impeller
42 . . . pump casing
48 . . . mounting hole
50 . . . pump driving shaft
58 . . . oil pump
60 . . . balancer weight
62 . . . recess
E . . . combustion engine

What is claimed is:

1. A vehicle having an engine with a water pump, the engine having a crank shaft extending in a vehicle widthwise direction, a crankcase supporting the crank shaft and a covering member fastened to an abutting surface at one side surface of the crankcase,
the water pump comprising:
a water pump shaft disposed in parallel to the crankshaft, the water pump shaft being drivingly coupled with the crankshaft;
an impeller fixed to a distal end portion of the water pump shaft; and
a pump casing rotatably supporting the water pump shaft, wherein
the entirety of the water pump is disposed laterally inward of the abutting surface in the vehicle widthwise direction, and
the pump casing is fitted in a mounting hole provided at an outer surface of the crankcase.

2. The vehicle as claimed in claim 1, wherein the water pump is accommodated in a recess that is formed at a position laterally inward of the abutting surface of the crankcase in the vehicle widthwise direction and that is recessed in a direction perpendicular to the water pump shaft.

3. The vehicle as claimed in claim 1, wherein the mounting hole overlaps a portion of the abutting surface in a side view.

4. The vehicle as claimed in claim 1, wherein an axis of the water pump shaft is displaced upward with respect to a center of the mounting hole.

5. The vehicle as claimed in claim 1, wherein the engine includes a pump driving shaft connected to the crankshaft, and the water pump shaft is concentrically connected to one end portion of the pump driving shaft.

6. The vehicle as claimed in claim 5, wherein the engine includes an oil pump provided at the other end portion of the pump driving shaft.

7. The vehicle as claimed in claim 1, further comprising a drive shaft configured to transmit a power of the engine to front wheels, wherein
the engine is located between right and left rear wheels and includes an oil pan provided below the crankcase, and
the water pump is located above the drive shaft that extends through a lateral side of the oil pan.

8. The vehicle as claimed in claim 1, wherein the engine includes a balancer shaft gear-connected to the crankshaft and a balancer weight provided at an end portion of the balancer shaft, and
the water pump is disposed laterally inward of the balancer weight in the vehicle widthwise direction.

* * * * *